March 19, 1968  A. D. GATCHELL  3,374,047
MAKEUP AID WHICH INCLUDES A MAGNIFYING
LENS IN FRONT OF A MIRROR
Filed April 16, 1964
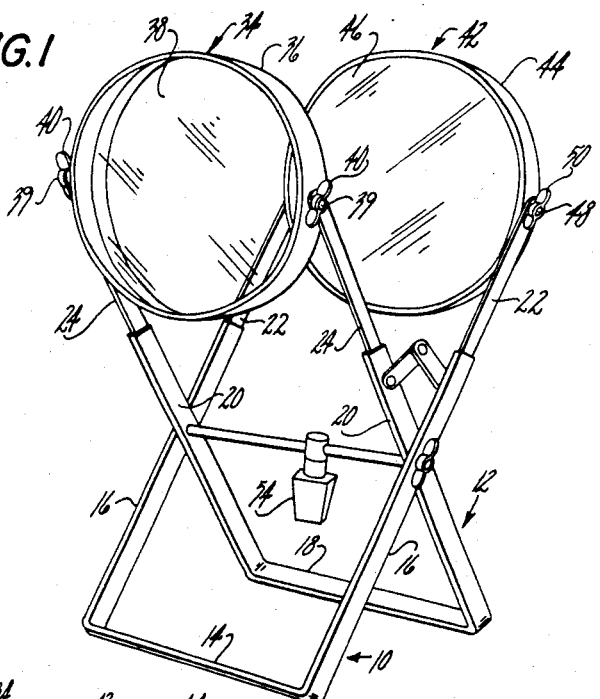
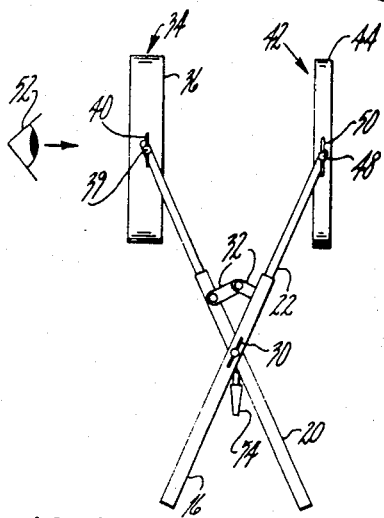
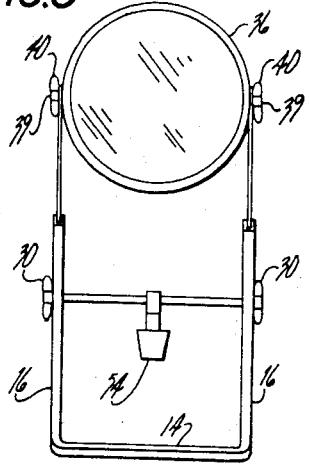
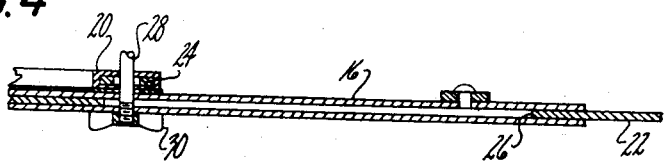
INVENTOR.
AZELINE D. GATCHELL
BY
McCormick, Paulding & Huber
ATTORNEYS

3,374,047
MAKEUP AID WHICH INCLUDES A MAGNIFYING LENS IN FRONT OF A MIRROR
Azeline D. Gatchell, Boston Hill Road, Andover, Conn. 06232
Filed Apr. 16, 1964, Ser. No. 360,456
4 Claims. (Cl. 350—199)

This invention relates to a makeup aid and has as its general object the provision of a device employing a mirror and a magnifying glass and providing a magnified image in a more efficient manner than has heretofore been possible.

The drawings show a preferred embodiment of the invention and such embodiment will be described, but it will be understood that various changes may be made from the construction disclosed and that the drawing and description are not to be construed as defining or limiting the scope of the invention, the claims forming a part of this specification being relied upon for that purpose.

Of the drawings:

FIG. 1 is a perspective illustration of the device of the present invention;

FIG. 2 is a side view;

FIG. 3 is a front view; and

FIG. 4 is a sectional view taken generally as indicated at 4—4 in FIG. 2.

Referring particularly to FIG. 1, it will be observed that first and second support means are indicated generally at 10 and 12 respectively. Each of the support means 10 and 12 includes a pair of legs, and in the presently preferred form, each of said support means comprises a U-shaped element having its base at the bottom with its legs extending upwardly. A base 14 of the support means 10 is shown with upwardly extending legs 16, 16 and, the support means 12 has a base 18 with upwardly extending legs 20, 20. The legs 16, 16 and the legs 20, 20 are spaced apart as shown for a purpose to be described hereinbelow.

In accordance with the presently preferred practice at least one of the support means has telescopic legs and as shown, each of the support means is so adapted. Thus, the legs 16, 16 have telescopic members 22, 22 associated therewith and slidable therewithin, the said legs being hollow as best illustrated in FIG. 4. The legs 20, 20 have members 24, 24 associated therewith and slidable therewithin, also best illustrated in FIG. 4.

Referring now more particularly to FIG. 4, it will be observed that the leg 16 receives the member 22 for longitudinal sliding movement therewithin and it will be further observed that said member is provided with an elongated slot 26. The slot 26 receives a rod 28 which is threaded at opposite end portions and which extends through suitable openings in the legs 16, 16 and the legs 20, 20. Thus, the rod 28 constitutes a means for pivotally supporting the support means 10 and 12. Wing nuts, one shown at 30, threaded on opposite ends of the rod 28 can be tightened to secure the support means in selected angular positions with respect to each other. Thus, the rod 28 and the wing nuts 30, 30 constitute a means for releasably holding the support means in selected adjusted positions and it is also to be observed that the said rod and nuts hold the telescopic members in adjusted positions within their respective legs.

It is preferred that a second or auxiliary frictional holding means be provided and such means is shown in the form of two small links 32, 32. The said links 32, 32 are connected together frictionally and are connected respectively with the legs 16 and 20. The frictional holding force of the links is such that finger pressure on the support means can overcome the force and yet the support means will not inadvertently or accidentally be moved from adjusted position.

Supported by and between the telescopic members 24, 24 associated with the legs 20, 20 is a magnifying glass assembly 34. The magnifying glass assembly 34 includes a rim portion 36 and a glass portion 38 therewithin. Projecting from the rim portion 36 are small threaded lugs 38, 38 entered respectively in suitable openings in the members 24, 24. Associated also with the lugs 39, 39 are small wing nuts 40, 40 adapted to hold the magnifying glass in position between the legs and to accommodate adjustment of the same pivotally about an axis passing through the lugs 39, 39.

A mirror assembly 42 is supported between the members 22, 22 associated with the legs 16, and is provided with a rim 44 and a conventional mirror surface 46 as shown. Short lugs 48, 48 associated with the rim 42 have wing nuts 50, 50 threaded thereon to accommodate pivotal adjustment of the mirror assembly and to hold the same in adjusted position in alignment with the magnifying glass 34.

Preferably and as shown the mirror assembly 42 has a conventional face such as 46 and its opposite face comprises a magnifying mirror. Thus, rotating the mirror through 180° presents a conventional or a magnifying mirror to a viewer situated at 52 in FIG. 2.

In use, the mirror 42 and the magnifying glass 34 may be aligned as illustrated in FIG. 2 whereupon the user can view through the magnifying glass to the mirror. A first degree or amount of magnification can be obtained by using the conventional surface of the mirror in alignment with the magnifying glass as shown in FIG. 2. If further intensity of magnification or a higher degree or amount of magnification is required, the mirror 42 can be rotated through 180° to bring the magnifying surface thereof into alignment with the magnifying glass. Still further, if it is desired to use either the magnifying glass or the mirror alone, it is possible to lower one set of telescopic members and raise the other set of telescopic members whereupon the viewer will have a clear line of vision to or through the selected viewing device.

Finally, it is to be observed that a small magnetic member is provided at 54. Small toiletry articles such as nail files and tweezers may be conveniently kept by merely placing the same against the said member.

The invention claimed is:

1. The combination in a makeup aid or the like of first and second upright support means each having a pair of spaced interconnected legs, means pivotally connecting the legs of said first and second support means so that lower end portions thereof engage and rest upon a flat horizontal surface with the upper portions spaced apart, a mirror supported between the legs of one of said first and second support means, a magnifying glass supported between the legs of the other of said support means so as to be aligned with the mirror for viewing therethrough, and means releasably holding the first and second support means in selected pivotally adjusted positions to vary the spacing between said magnifying glass and the mirror.

2. The combination in a makeup aid or the like as set forth in claim 1 wherein said mirror includes first and second surfaces one of which is a conventional plane mirror and the other of which is a magnifying mirror, and wherein the mirror is pivotally held between its supporting legs so that said surfaces can be aligned selectively with said magnifying glass.

3. The combination in a makeup aid or the like as set forth in claim 2 wherein at least one of said support means is provided with telescopic legs.

4. The combination in a makeup aid or the like as set forth in claim 3 wherein each of said support means comprises a generally U-shaped member with its base at the bottom and its legs extending upwardly therefrom.

(References on following page)

References Cited

UNITED STATES PATENTS

| | | | |
|---|---|---|---|
| 565,596 | 8/1896 | Bloch | 350—70 |
| 1,873,943 | 8/1932 | Woller. | |
| 2,026,010 | 12/1935 | Woller | 350—293 |
| 2,327,096 | 8/1943 | Dann | 350—298 |
| 2,861,501 | 11/1958 | Strelakos | 350—235 |
| 3,179,361 | 4/1965 | O'Brien | 248—472 |

JEWELL PEDERSEN, *Primary Examiner.*

O. B. CHEW, *Assistant Examiner.*